United States Patent [19]

Hershey

[11] 4,364,571

[45] Dec. 21, 1982

[54] TAPERED SEAL SEAT BETWEEN STATIONARY INSERT AND GLAND

[75] Inventor: Lowell E. Hershey, Portage, Mich.

[73] Assignee: Durametallic Corporation, Kalamazoo, Mich.

[21] Appl. No.: 195,461

[22] Filed: Oct. 9, 1980

[51] Int. Cl.³ .......................... F16J 15/38; F16J 15/36
[52] U.S. Cl. ......................................... 277/86; 277/87
[58] Field of Search .................................... 277/84–87, 277/93, 93 SD, 88

[56] References Cited

U.S. PATENT DOCUMENTS

| | | | |
|---|---|---|---|
| 3,031,199 | 4/1962 | Laser et al. | 277/86 |
| 3,043,598 | 7/1962 | Moxon | 277/86 |
| 3,445,119 | 5/1969 | Andresen | 277/86 |
| 3,484,113 | 12/1969 | Moore | 277/86 |
| 3,655,206 | 4/1972 | Adams | 277/87 |
| 3,773,337 | 11/1973 | Adams | 277/89 |
| 3,807,742 | 4/1974 | Hershey | 277/87 |
| 4,124,218 | 7/1978 | Wentworth | 277/86 |

FOREIGN PATENT DOCUMENTS 2301082  8/1973  Fed. Rep. of Germany ........ 277/85

Primary Examiner—Robert I. Smith
Attorney, Agent, or Firm—Blanchard, Flynn, Thiel, Boutell & Tanis

[57] ABSTRACT

A mechanical seal assembly having an improved packing arrangement between the gland and the insert. The packing arrangement utilizes a laminated graphite packing positioned within an annular recess formed between the gland and the insert. One of the annular seats for the packing, such as the inner annular surface defined on the insert, is provided with a slightly tapered configuration so that the continual urging of the insert toward the gland, coupled with the tapered configuration of the seating surface, causes the packing to be continuously compressed and reseated against the inner and outer seating surfaces, whereby leakage of corrosive and/or high temperature fluid past the packing is greatly reduced.

4 Claims, 4 Drawing Figures

TAPERED SEAL SEAT BETWEEN STATIONARY INSERT AND GLAND

FIELD OF THE INVENTION

This invention relates to a mechanical seal construction, and particularly a bellows-type seal construction, having an improved seal or packing between the gland and the stationary insert.

BACKGROUND OF THE INVENTION

Mechanical seal assemblies are conventionally utilized on fluid handling equipment such as pumps and the like which are utilized in conjunction with highly corrosive and/or high temperature fluids, such as chemicals, petro-chemicals, steam and the like. These seal assemblies, in their most common mode of usage, are of the "inside" type in that the seal assembly is positioned in surrounding relationship to a rotatable shaft and is dispoed within a recess formed in the surrounding housing. A stationary gland is conventionally positioned adjacent the outer end of the recess and is fixedly secured to the housing, as by screws, which gland in turn nonrotatably mounts thereon the stationary annular seal member (commonly referred to as the gland insert), which insert supports the nonrotatable seal face ring. To prevent leakage between the gland and the gland insert, an annular packing or gasket is provided therebetween. This conventional arrangement is illustrated in U.S. Pat. No. 3,773,337 (owned by the assignee of this application) which, in FIG. 2 thereof, discloses a packing 23 coacting between the gland 18 and the gland insert 17. As is conventional in this industry, the packing is an axially laminated gasket constructed of a graphite material generally sold under the name "Grafoil" (trademark), but packings of other materials are utilized.

This packing as located between the gland and the insert has traditionally permitted limited leakage therepast, particularly in use situations involving high temperatures (such as in the order of 350° to 400° F., or above) since such use conditions have severely restricted the materials which can be successfully utilized for the packing. At the present time, most manufacturers of mechanical seal assemblies utilize a laminated graphite material for the packing in view of its capability of withstanding exposure to high temperatures and corrosive fluids. This laminated graphite packing, which is of rectangular cross-section, does operate generally satisfactorily, but nevertheless still permits limited leakage therepast due to variations (such as temperature-induced differential expansion and the like) which occur within the seal assembly within operation. However, in view of the fact that the leakage has generally been considered small, and since no better packing has been developed which overcomes the leakage problem while at the same time operating successfully under the aforementioned use conditions, manufacturers and users alike have thus tolerated the small amount of leakage past the packing.

Some attempts have been made, however, to prevent this leakage past the packing since, while the leakage has been tolerated, it is not desired. For example, in one prior attempt, a metal gasket has been used as the packing between the gland and the insert. Another prior attempt has involved the use of screws or springs for mechanically loading or compressing the packing so as to improve the sealing characteristics thereof. This latter attempt, however, is totally unacceptable when the seal assembly utilizes carbide seal rings inasmuch as it is extremely hard and hence cannot be successfully utilized with screws or similar clamping devices. Further, with respect to both of these attempts, only an extremely limited space is available for the packing, and access to this space is extremely difficult, so that both of these prior attempts have hence been unsuccessful and unsatisfactory in that the structures have been undesirably complex, and they have failed to significantly reduce the leakage past the packing.

In addition to leakage past the packing caused by differential expansion of the seal assembly components, it is believed that some of the leakage past the packing also occurs due to a general deterioration of the laminated graphite packing. Due to the lamination of the packing, it is believed that the packing initially possesses at least limited resiliency, particularly in its axial direction, so that the end faces thereof initially maintain a tight sealing contact with the opposed axial faced formed on the insert and the gland. However, during continued operation of the mechanical seal assembly, the exposure of the packing to the hot fluid causes the packing to become saturated, and also causes the packing to lose some of its compressibility, whereby leakage occurs through and/or around the packing.

Accordingly, it is an object of this invention to provide an improved mechanical seal construction which employs an improved packing arrangement between the gland and the insert, which packing arrangement still permits successful utilization of the seal assembly with corrosive and/or high temperature fluids, while resulting in a substantial reduction in the amount of leakage past the packing during long-term operation of the seal assembly.

In the improved seal assembly of this invention, the improved packing arrangement again utilizes a laminated graphite packing of substantially rectangular cross-section and positioned within a suitable annular recess formed between the gland and the insert. However, one of the annular seats for the packing, such as the inner annular surface defined on the insert, is provided with a slightly tapered configuration so that the continual urging of the insert toward the gland, coupled with the tapered configuration of the inner seating surface, causes the laminated graphite packing to be continuously compressed and reseated against the inner and outer seating surfaces, whereby leakage of corrosive and/or high temperature fluid past the packing is greatly reduced. In fact, experimental testing of this improved packing arrangement indicates that the leakage of fluid or product past the packing is reduced by several orders of magnitude in comparison to the leakage which occurs past the laminated graphite packing when same is seated in a conventional manner between opposed concentric inner and outer seating surfaces as defined on the insert and gland respectively.

Other objects and purposes of the invention will be apparent upon reading the following specification and inspecting the accompanying drawings.

Figure 1:
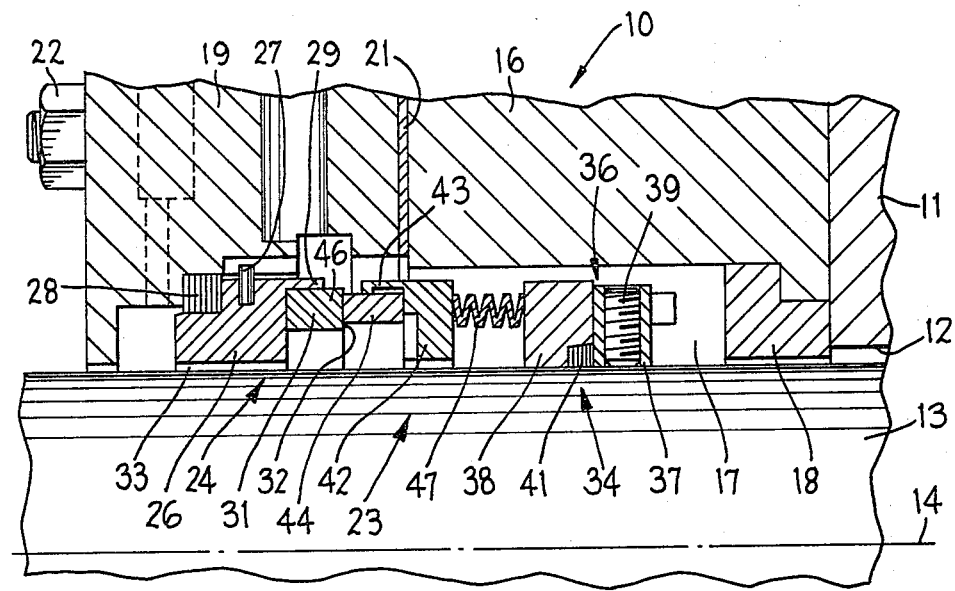
FIG. 1 is a fragmentary sectional view of a conventional bellows-type mechanical seal assembly of the inside type.

Certain terminology will be used in the following description for convenience in reference only. For example, the words "upwardly", "downwardly", "rightwardly" and "leftwardly" will refer to directions in the drawings to which reference is made. The words "inwardly" and "outwardly" will refer to directions toward and away from, respectively, the geometric center of the seal assembly and designated parts thereof. Said terminology will include the words specifically mentioned, derivatives thereof, and words of similar import.

DETAILED DESCRIPTION

FIG. 1 illustrates a shaft seal construction 10 associated with an apparatus which includes a wall 11 having an opening 12 through which extends a shaft 13 rotatable about its axis 14. The wall 11 may be part of any conventional fluid handling device, such as a pump, whereby pressurized fluid is present within the apparatus and hence tends to escape through the opening 12.

To prevent escape of fluid, the seal arrangement 10 is provided for creating a sealed relationship between wall 11 and shaft 13. For this purpose, the seal arrangement 10 includes a conventional annular stuffing box or housing 16 secured to the wall 11 in surrounding relationship to the shaft. The stuffing box 16 defines an annular chamber 17 which communicates with the opening 12. A conventional throat bushing 18 is associated with the inner end of this chamber 17 for restricting flow of pressure fluid through the opening 12 into the chamber.

A further annular housing element 19, commonly referred to as a gland, is positioned directly adjacent the stuffing box 16 and is suitably sealed thereto, as by an intermediate gasket 21. A plurality of conventional threaded fastening elements 22 are utilized for fixedly interconnecting the stuffing box 16 and gland 19 to the wall 11.

An "inside" type mechanical seal assembly 23 is disposed within the annular chamber 17 for creating a sealed relationship between the shaft 14 and the gland 19, while permitting relative rotation therebetween. The mechanical seal assembly 23 includes a stationary seal portion 24 which is nonrotatably connected to the gland 19. This portion 24 includes an annular seal member 26 (commonly referred to as a gland insert) which is non-rotatably connected to the gland 19 by a suitable key or pin 27. A packing ring or gasket 28, such as an axially laminated gasket constructed of a graphite material sold under the name "Grafoil" (trademark), is provided within an annular recess between the gland 19 and the insert 26, as explained in greater detail hereinafter.

Insert 26 has an annular flange 29 which projects axially from the inner end thereof, which flange snugly and supportingly embraces (by means of an interference or press fit) an annular face ring 31, which latter ring defines a flat annular seal face 32 on the outer or exposed axial end thereof. A suitable annular clearance 33 exists between the insert 26 and the shaft 14 to permit unrestricted relative rotation and angular or lateral movement or deflection of the shaft relative to the surrounding housing.

The mechanical seal assembly 23 also includes a rotary seal portion 34. This latter portion 34 includes an annular collar 36 formed by first and second ringlike collar members 37 and 38, respectively, which are fixedly connected by suitable screws or the like. The collar is fixed to the shaft 13 by any conventional means, such as set screw 39. A suitable seal ring or gasket 41 is clampingly sealed between the two collar members to create a sealed engagement with the periphery of the shaft 13. This gasket 41 is also preferably of a layered or laminated graphite material.

Rotary seal portion 34 also includes a rotatable annular seal member 42 which surrounds the shaft 14 and has an inner diameter substantially larger than the shaft 14 to permit relative lateral and/or angular movement therebetween. The seal ring 42 has an annular flange 43 which projects axially from the outer end thereof, which flange defines an annular recess in which is positioned an annular face ring 44, the latter being fixedly mounted and supported on the seal ring by means of a press or interference fit within the flange 43. This face ring 44 defines a transverse or radial seal face 46 on the outer axial end thereof, which face 46 is urged into rotatable slidable engagement with the opposed seal face 32.

In the illustrated embodiment, a conventional metal bellows seal 47 extends between the collar 36 and the seal ring 42 for nonrotatably and sealingly joining same together. This bellows 47 encircles the shaft 13 and has one end thereof fixedly and sealingly connected, as by welding, to the collar 38. The other end of bellows 47 is fixedly and sealingly connected, as by welding, to the seal ring 42. The metal bellows 47 is of substantially conventional construction and includes a plurality of individual bellows plates, preferably constructed from stainless steel, with the adjacent bellows plates alternately having their inner and outer peripheries welded together around the complete peripheries thereof to provide a fluid-tight joint while at the same time permitting the bellows to have the desired flexibility.

The bellows 47 also functions as a resilient device for normally resiliently urging the seal ring 42 toward the gland insert 26, thereby maintaining the seal faces 32 and 46 in sealing engagement with one another. While the resiliency of bellows 47 is normally sufficient for this purpose, nevertheless additional resiliency can be provided if necessary by utilization of one or more conventional coil springs positioned for coaction between the collar 38 and the seal ring 42.

The face rings 31 and 44 are normally constructed of materials such as tungsten carbide or silicon carbide. These materials not only have different thermal expansion characteristics than the supporting rings (which often are stainless steel), but they are also extremely hard so that complex machining of the face rings is difficult, and they are not normally weldable.

The overall shaft seal arrangement 10 illustrated in FIG. 1, as briefly described above, is substantially conventional. Reference is made to U.S. Pat. No. 3,773,337, wherein this type arrangement is described in greater detail.

Figure 2:
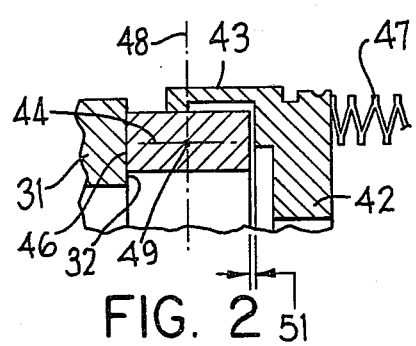
FIG. 2 is an enlarged fragmentary sectional view illustrating the desired construction of the face and seal arrangement.

To minimize distortion of the face ring, specifically the ring 44 due to the differential thermal expansion which exists between the face ring 44 and the seal ring 42, it has been discovered that mounting the face ring 44 in the manner illustrated in FIG. 2 greatly minimizes any leakage therepast. With this mounting arrangement, the face ring 44 is pressed within the flange 43 on the ring 42 in such a manner that the holding force imposed on the face ring 44 is directed substantially radially inwardly thereof along the plane 48 which contains therein the centroid 49 of the face ring 44. In addition, the rear face of the face ring 44 is suitably spaced from the support ring 42 by means of an intermediate gap 51 therebetween. This results in the holding forces imposed on the face ring 44 thus being disposed substantially entirely within the central transverse plane 48 to thereby prevent distortion of the face ring 44.

The overall seal arrangement 10 illustrated and described, and specifically the improved mounting for the face ring as illustrated by FIG. 2, is described in detail in my copending application Ser. No. 140,338, filed Apr. 14, 1980. The disclosure of this latter application is, in its entirety, incorporated herein by reference.

Figure 3:
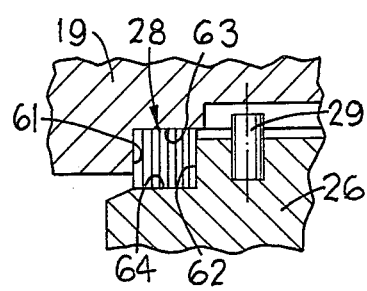
FIG. 3 is an enlarged fragmentary sectional view illustrating the conventional packing arrangement.

In the known packing arrangement as illustrated in FIG. 3, the packing 28 comprises an annular packing or gasket ring preferably of an axially laminated construction, such as being formed from a plurality of axially-stacked washer-like wafers or plates formed of a graphite material, as explained above. This packing 28 is compressed between opposed faces 61 and 62 formed on the gland 19 and insert 26, respectively, which faces 61 and 62 extend radially of the respective elements and are substantially parallel so as to axially confine the packing 28 therebetween. The packing 28 is also confined between inner and outer annular seating surfaces 63 and 64 as associated with the gland 19 and insert 26, respectively, which seating surfaces 63 and 64 are parallel and concentric relative to one another and relative to the shaft axis 14. These seating surfaces 63 and 64 thus cooperate with the outer and inner annular peripheries, respectively, of the packing 28 to create areas of sealed engagement therebetween. While these latter areas do provide effective seals, nevertheless leakage past these areas has been observed, particularly when the mechanical seal assembly is subject to severe temperature extremes inasmuch as the gland 19 and insert 26 are normally constructed of materials having substantially different coefficients of thermal expansion, whereby the spacing between surfaces 63 and 64 undergoes substantial variation. Also, the packing 28 tends to lose its resiliency after substantial usage, presumably due to becoming filled with fluid, whereby some of the radial sealing contact between the packing and the surfaces 63 and 64 is hence lost.

Figure 4:
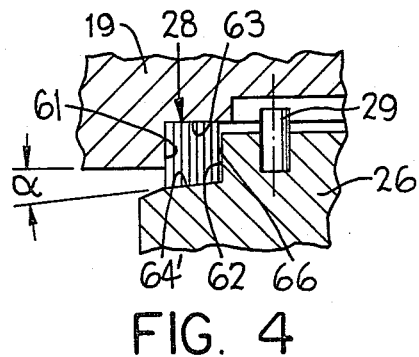
FIG. 4 is an enlarged fragmentary sectional view illustrating the improved packing arrangement according to the present invention.

To eliminate or at least greatly minimize leakage past the packing when constructed in the conventional manner illustrated by FIG. 3, the present invention accordingly provides an improved packing arrangement constructed substantially as illustrated by FIG. 4. This improved packing arrangement of FIG. 4 bears many structural and operational similarities to the conventional packing arrangement shown in FIG. 3, and hence the same reference numerals have been utilized to designate the same parts. Where the parts or components in the FIG. 4 improvement are slightly different from the corresponding parts in the conventional packing arrangement of FIG. 3, then the modified parts utilize the same reference numerals but are additionally designated by a prime (').

According to the present invention, one of the annular seating surfaces corresponding to 63 and 64 in FIG. 3, preferably the inner seating surface 64' as illustrated in FIG. 4, is of a slightly tapered (that is, conical) configuration so that a small wedge-like angle of divergence exists between the surfaces 63 and 64'. This slight angle of taper associated with the surface 64', which angle is designated $\alpha$ and is measured relative to the axial direction, is preferably in the range of between 2° and 5°, although this angle can probably be as large as 8°. It has been experimentally determined that an angle $\alpha$ of 3° provides for greatly reduced leakage past the packing 28. The direction of slope of the angle $\alpha$ as associated with one of the surfaces 63 and 64' is selected such that the surfaces 63 and 64' axially converge with respect to one another as these surfaces project axially toward the face ring 31 and hence toward the bellows 47. Thus, since the bellows 47 functions as a spring and hence urges the mechanical seal assembly 23 outwardly (leftwardly in FIG. 1) relative to the gland 19, this results in the insert 26 being continuously urged axially toward (leftwardly) the gland 19 so that the laminated packing 28 is hence continuously compressed both axially and radially between the gland 19 and insert 26 due to the tapered converging relationship between the seating surfaces 63 and 64'. To permit this continuous axial and radial compression of the packing 28 so as to compensate for variations, such as differential thermal expansions and contractions between gland 19 and insert 26, the packing 26 is initially of a uniform inside diameter which is slightly smaller than the maximum diameter of the tapered surface 64' (namely the diameter adjacent the rightward end thereof) such that when the packing 28 is initially pressed onto the seat 64', the rightward axial end face of the packing 28 is separated from the opposed face 62 by a small gap or clearance space 66 therebetween. This gap 66 is normally extremely small as measured in the axial direction, such as in the order of several mils (that is, several one-thousandths of an inch). Thus, during operation of the mechanical seal assembly, any tendency for the packing 28 to lose its compressibility and hence permit leakage therepast, is compensated for by the fact that the bellows 47 (assisted by additional compression springs if provided) resiliently urges the ring 42 and hence the insert 26 leftwardly so that the packing 28 is thus effectively moved axially toward the face 62 due to the presence of the gap 66. Since the peripheral seating surfaces 63 and 64' define a slight taper therebetween which taper converges as the insert 26 is urged rightwardly relative to the gland 19, this accordingly causes a reseating of the packing 28 on surfaces 63 and 64' and a continual radial compression of the packing 28 between these surfaces 63 and 64' so as to maintain a proper sealing relationship therebetween. Hence, the leakage of fluid past the packing 28 is greatly minimized, even when the mechanical seal assembly is operated over long and extended periods. In fact, experimental tests conducted of the improved packing arrangement of this invention, as illustrated in FIG. 4, demonstrate a severalfold decrease in leakage past the packing when compared with the conventional structure of FIG. 3.

In the improved packing arrangement of FIG. 4, the packing ring 28 is preferably of conventional construction in that the inner and outer annular surfaces are of uniform or constant diameter throughout the axial extent of the ring. That is, the packing ring is not tapered since such a structure would be extremely expensive to fabricate, and would also result in the packing ring being directional, that is right and left characteristics. Hence, when the packing ring 28 is positioned on the tapered surface 64', maximum contact pressure and hence sealing engagement exists adjacent the rightward end of the seal ring in view of its contacting the larger diameter portion of the surface 64'. Thus, the individual washers or plates which form the laminated packing, namely those plates located adjacent the rightward end, are compressed more tightly into sealing engagement with the surface 64', although the number of such plates contacting the surface 64' must be maximized in order to achieve optimum sealing contact with surface 64'. For this reason, the slope or angle $\alpha$ of surface 64' must be maintained fairly small, as noted above, since otherwise the number of individual plates or washers of ring 28 contacting the surface 64' will be too small to achieve the desired sealing contacts. Further, this small taper is also necessary to permit the packing ring to be slidably forced onto the surface 64' without requiring an excessive installation force.

It will be appreciated that the taper can be provided on the outer seating surface 63 if desired, in which case the taper would slope radially outwardly as it projects axially from left to right, although providing the taper on the inner surface 64' is preferred from the standpoint of both manufacture and assembly of the mechanical seal.

The operation of the mechanical seal assembly is believed to be well understood, so that a detailed description of same is believed unnecessary.

While the improved packing arrangement of this invention is disclosed in combination with a bellows-type mechanical seal, and while incorporation of this packing is particularly desirable with this type seal, in view of their extensive use in applications employing high-temperature and/or corrosive fluids or products, nevertheless it will be appreciated that the improved packing arrangement is also desirable for incorporation into conventional mechanical seals of non-bellows-type, particularly where such seals are utilized with high-temperature and/or corrosive fluids and hence require a packing which can withstand such fluids, such as is true of a laminated graphite packing. In addition, while the invention is disclosed in combination with a rotatable bellows-type seal, that is, one in which the bellows rotates with the shaft, it will be appreciated that this invention is equally applicable to bellows-type mechanical seals wherein the bellows is nonrotatably fixed relative to the surrounding housing.

Although a preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a bellows-type mechanical seal construction for use between a wall and a shaft extending therethrough and rotatable relative thereto, wherein said mechanical seal construction has first and second annular sealing members which surround the shaft and have mutually contacting sealing faces, said first sealing member being nonrotatably fixed with respect to the wall, the second sealing member being nonrotatably fixed and axially slidable relative to the shaft, a collar fixed to the shaft, metal bellows means sealingly connected between the collar and said second sealing member for resiliently urging the second sealing member axially into engagement with said first sealing member, a gland ring fixed to the wall in surrounding relationship to the shaft, the first annular sealing member being nonrotatably fixed relative to the gland ring, the gland ring and the first sealing member defining thereon a first pair of opposed end faces which are axially spaced apart and a second pair of opposed peripheral faces which are radially spaced apart, whereby said first and second pairs of opposed faces define an annular recess therebetween, and an annular packing disposed within said recess for creating a sealed relationship between the gland ring and the first sealing member, said annular packing being of an axially laminated graphite construction, said bellows means resiliently urging the first sealing member axially relative to the gland ring in a selected direction whereby the opposed axially-spaced end faces thereon tend to move toward one another, comprising the improvement wherein the opposed radially-spaced peripheral faces which define said second pair are disposed in nonparallel relationship and define a slope therebetween in the range of from 2° to 5° so that said peripheral faces diverge with respect to one another as they project axially in said selected direction, said annular packing having one of its axial end faces directed toward but slightly axially spaced from one of said end faces so as to define an annular clearance gap therebetween which is of small axial dimension, said clearance gap being located at the axial end of said annular recess which is of minimum radial spacing between the pair of opposed peripheral faces, and said bellows means causing said packing to be axially urged toward said one axial end face and radially compressed between said opposed radially-spaced peripheral faces due to the relative convergence between these latter faces in response to the urging of said first sealing member in said selected direction relative to said gland ring.

2. A mechanical seal construction according to claim 1, wherein said clearance gap initially has a maximum axial width of approximately 0.030 inch.

3. A mechanical seal construction according to claim 1, wherein one of said radially-spaced peripheral faces as formed on said gland ring extends axially parallel to the longitudinal axis of said shaft, and wherein the other of said radially-spaced peripheral faces as formed on said first sealing member extends approximately parallel with but axially sloped at a small angle relative to the longitudinal axis of said shaft, whereby said latter face defines a truncated conical surface relative to said axis.

4. A mechanical seal construction according to claim 1 or claim 3, wherein said clearance gap initially has an axial width of at least 0.005 inch, and preferably an axial width within the range of 0.010 to 0.030 inch.

* * * * *